3,326,959
PRESERVATION OF RUBBER WITH PARA-BETA-CYANOETHYLAMINODIPHENYLAMINE
Ching C. Tung, Kirkwood, Mo., and Myron H. Wilt, Monroeville, Pa., assignors to Monsanto Company, a corporation of Delaware
No Drawing. Filed Nov. 5, 1962, Ser. No. 235,557
1 Claim. (Cl. 260—465)

This invention relates to the preservation of oxidizable compositions such as rubber, petroleum and vegetable products and, more particularly, to the provision and use of a new class of para-beta-cyanoalkylaminodiphenylamines which are useful as age resistors for various oxidizable rubbers, gasoline and carotene.

It is an object of the present invention to provide antioxidant and antiozonant compositions which are capable of protecting various oxidizable rubbers, petroleum products and vegetable products for extended periods of time. It is another object of this invention to provide para-beta-cyanoalkylaminodiphenylamines which are capable of protecting various oxidizable rubber, petroleum and vegetable products from deterioration from oxygen, ozone and/or sunlight.

In the practice of this invention, oxidizable compositions are protected from deterioration by means of para-beta-cyanoalkylaminodiphenylamines and N-nitroso para-beta-cyanoalkylaminodiphenylamines.

The para-beta-cyanoalkylaminodiphenylamines of this invention may be made by reacting a para-aminodiphenylamine with an unsaturated aliphatic nitrile. For best results, the reaction is carried out in the presence of an acidic catalyst such as acetic acid, oxalic acid, formic acid, chloroacetic acid, sulfuric acid, copper salts, and ammonia or amine salts of strong acids. It is preferred to complete the reactions within a temperature range of 100–200° C. The invention may be further illustrated by the following examples:

There was charged to a 500 ml. 3-necked, round bottom flask, 92.12 grams (0.5 mole) of para-aminodiphenylamine, 26.5 grams (0.5 mole) of acrylonitrile and 2.5 grams (0.125 mole) of copper acetate monohydrate. The mixture was then heated to refluxing temperature, held at reflux for about four hours, cooled and crystallized from methanol. The methanol solution was filtered to remove catalyst while the solution was hot. Para-beta-cyanoethylaminodiphenylamine was obtained in 68.3% yield as a gray crystalline solid which melted at 128° C. Analysis gave 16.95% nitrogen compared to 17.75% calculated for $C_{15}H_{15}N_3$.

The compound was nitrosated by treating with sodium nitrite. To 23.8 grams (0.1 mole) of para-beta-cyanoethylaminodiphenylamine was added 300 ml. of isopropyl alcohol and the mixture heated with stirring to 82° C. to effect partial solution. The mixture was then cooled to 25° C. and 28 grams (0.28 mole) of concentrated hydrochloric acid added in one portion. To this cooled solution was added dropwise at 25–30° C. in 5 minutes, 16 grams (0.228 mole) of 98.3% sodium nitrite dissolved in 24 ml. of water. After stirring for 30 minutes at 25–30° C., the mixture was cooled to 0° C., the precipitate collected by filtration, washed with water until neutral and air dried at 25–30° C. N,N'-dinitroso-para-beta-cyanoethylaminodiphenylamine was obtained as a brown solid in 78% yield. After two recrystallizations from ethanol it melted at 88–89° C. Analysis gave 23.68% nitrogen (Dumas) compared to a calculated value of 23.72% for $C_{15}H_{13}N_5O_2$.

As illustrative of the improved properties imparted to natural rubber, compositions were prepared as follows:

|  | Stock—Parts by weight | | |
|---|---|---|---|
|  | A | B | C |
| Smoked sheets rubber | 100 | 100 | 100 |
| Carbon black | 50 | 50 | 50 |
| Saturated hydrocarbon softener | 3 | 3 | 3 |
| Zinc oxide | 5 | 5 | 5 |
| Stearic acid | 3 | 3 | 3 |
| Sulfur | 2.5 | 2.5 | 1 |
| N-tert.-butyl-2-benzothiazolesulfenamide | 0.5 | 0.5 | 0.5 |
| Commercial antidegradant | 1.5 |  |  |
| Para-beta-cyanoethylaminodiphenylamine |  | 1.5 | 1.5 |
| N,N'-dithiobis morpholine |  |  | 1.0 |

The stocks were cured in the usual manner by heating in a press for 45 minutes at 144° C. Set forth below are the percentages of the original tensile retained after aging 72 hours in an air oven at 100° C.

TABLE I

Stock:                                  Percent tensile retained
A ------------------------------------------- 59.3
B ------------------------------------------- 76.4
C ------------------------------------------- 83.5

Resistance of the vulcanizates to ozone was also evaluated. Since evaluation under static conditions is not indicative of the service obtained with many types of rubber articles which must withstand flexing, the vulcanized compositions were evaluated under dynamic conditions in an atmosphere containing a definite concentration of ozone. The test was carried out in the following manner: Samples of the stocks were cured in the form of a belt ½" wide, ¼" thick and 5⅚₆" in diameter and mounted on 1" diameter shafts. The ozone concentration was maintained at 20–30 parts per hundred million throughout the test and the shafts were rotated at 75 r.p.m. In this manner a momentary elongation through a range of 0–20% was provided at any portion of the test specimen passing over the shaft. (The apparatus and procedure employed were described in Analytical Chemistry, vol. 25, page 241, February 1953). The experimental test specimens were compared visually at various intervals noting the extent of cracking. A stock which is severely cracked has no service life remaining in terms of the useful life of a rubber article. The results of the tests are set forth below. In the table the numbers are ratings where 1 represents no cracking, 2 very slight cracking, 3 slight cracking, 4 moderate cracking and 5 severe cracking.

TABLE II

| Stock | Surface Cracking after Flexing in Ozone for— | | | | |
|---|---|---|---|---|---|
|  | 12 Hrs. | 24 Hrs. | 36 Hrs. | 48 Hrs. | 60 Hrs. |
| A | 2 | 3 | 4 | 4 | 5 |
| B | 2 | 3 | 4 | 4 | 4 |
| C | 1 | 2 | 3 | 3 | 3 |

Stock C is illustrative of vulcanization with organic sulfide vulcanizing agents and only a very small amount of elemental sulfur. These vulcanizates are ordinarily deficient in resistance to flex cracking but are improved by the new anti-degradants. Anti-cut growth measurements were made on an India flexing machine. The number of cycles to failure were determined after first forming the usual slight cut in the test piece. The number of kilocycles to failure was 640 for the C stock as compared to 540 kilocycles to failure for the A stock containing the commercial antidegradant.

As a further example demonstrating the effectiveness of the compounds of this invention, N,N'-dinitroso-para-beta-cyanoethylaminodiphenylamine was substituted for the compound in stock B. The stock was cured by heating 45 minutes at 144° C. and then aged for 24 hours at 100° C. in a test tube according to A.S.T.M. designation D865–57, A.S.T.M. Standards, 1958, p. 1453. The proportion of the original tensile strength retained was 77% while that for the same stock containing no antioxidant was 44%.

The rubbers which can be protected by the products of this invention are the oxidizable rubbery polymers of conjugated dienes which include natural rubber and the various synthetic diene rubbers which are similar to natural rubber in their aging characteristics, such as polychloroprene; butyl rubber, which is a polymerization product of a major proportion of a monoolefin, such as isobutylene, and a minor proportion of a multiolefin, such as butadiene or isoprene; the rubbery copolymers of butadiene and styrene which may contain from 50 to 75% by weight of butadiene; the rubbery copolymers of butadiene and acrylonitrile and polyisoprene.

The products of the invention are useful as age resistors for raw rubbers in latex form, coagulated rubber latices or vulcanized rubbers, and may be present in an amount of from 0.25 to 5.0% by weight, based on the weight of the rubber, although it is generally preferred to use from 0.5 to 2.0% by weight, based on the weight of rubber.

The antioxidants of this invention can be incorporated into rubber in any customary manner. They may be added in the form of physical mixtures or in the form of emulsions using any of the known emulsifiers such as monovalent metal hydroxides, fatty acids, organic soaps, etc. They may be added to the rubber in the form of latex, or they may be milled into coagulated rubber in the usual manner.

For the stabilization of petroleum hydrocarbons such as gasoline, kerosene, fuel oil and diesel oils and for stabilizing vegetable oils and alfalfa meal, amounts within the range of 0.001% to 0.1% by weight of antioxidant are usually satisfactory.

It is intended to cover all changes and modifications of the examples of the invention herein chosen for purposes of disclosure which do not constitute departures from the spirit and scope of the invention.

What is claimed is:

N,N' - dinitroso - para - beta-cyanoethylaminodiphenylamine.

References Cited

UNITED STATES PATENTS 3,008,921   11/1961   Kline _____ 260—45.9

DONALD E. CZAJA, *Primary Examiner.*

L. J. BERCOVITZ, J. R. LIBERMAN, H. E. TAYLOR,
*Assistant Examiners.*